(12) United States Patent
Balla et al.

(10) Patent No.: US 12,476,970 B2
(45) Date of Patent: Nov. 18, 2025

(54) VALIDATION OF CLOUD PROVIDER APPLICATION PROGRAMMING INTERFACE (API) PRIVILEGES

(71) Applicant: VMware LLC, Palo Alto, CA (US)

(72) Inventors: Suresh Balla, Visakhapatnam (IN); Umedh Meshram, Pune (IN)

(73) Assignee: VMware LLC, Palo Alto, CA (US)

( * ) Notice: Subject to any disclaimer, the term of this patent is extended or adjusted under 35 U.S.C. 154(b) by 221 days.

(21) Appl. No.: 18/379,202

(22) Filed: Oct. 12, 2023

(65) Prior Publication Data

US 2025/0055847 A1 Feb. 13, 2025

(30) Foreign Application Priority Data

Aug. 9, 2023 (IN) .............................. 202341053301

(51) Int. Cl.
*H04L 9/40* (2022.01)
*G06F 9/54* (2006.01)

(52) U.S. Cl.
CPC .............. *H04L 63/10* (2013.01); *G06F 9/547* (2013.01)

(58) Field of Classification Search
None
See application file for complete search history.

(56) References Cited

U.S. PATENT DOCUMENTS

| 10,382,275 | B1* | 8/2019 | Stickle .................... H04L 41/40 |
| 10,891,121 | B2 | 1/2021 | Govindaraju et al. |
| 2018/0227369 | A1* | 8/2018 | DuCray ................. G16H 40/20 |
| 2023/0409408 | A1* | 12/2023 | Walshe ................. G06F 9/5077 |
| 2023/0412570 | A1* | 12/2023 | Holm .................... H04L 67/133 |
| 2024/0007492 | A1* | 1/2024 | Shen .................... H04L 63/1425 |
| 2024/0305634 | A1* | 9/2024 | Wattiau .................. H04L 63/20 |

* cited by examiner

Primary Examiner — Jeffrey R Swearingen
(74) Attorney, Agent, or Firm — Quarles & Brady LLP

(57) ABSTRACT

Systems, apparatus, articles of manufacture, and methods are disclosed for template generation to enforce desired states on cloud accounts. An example apparatus disclosed herein includes programmable circuitry to access a privilege from a cloud account, the privilege associated with a resource to be deployed based on a template, validate the privilege relative to template privileges specified in the template, secure the resource before deployment of the resource by imputing a privilege access condition to the resource based on the privilege satisfying at least one of the template privileges, and deploy the resource based on the template in a secure state, the secure state corresponding to the privilege access condition.

20 Claims, 8 Drawing Sheets

VALIDATION OF CLOUD PROVIDER APPLICATION PROGRAMMING INTERFACE (API) PRIVILEGES

RELATED APPLICATIONS

Benefit is claimed under 35 U.S.C. 119 (a)-(d) to Foreign application No. 202341053301 filed in India entitled "VALIDATION OF CLOUD PROVIDER APPLICATION PROGRAMMING INTERFACE (API) PRIVILEGES", on Aug. 9, 2023, by VMware, Inc., which is herein incorporated in its entirety by reference for all purposes.

FIELD OF THE DISCLOSURE

This disclosure relates generally to distributed computing and, more particularly, to validation of cloud provider application programming interface (API) privileges.

BACKGROUND

In recent years, cloud-based systems have enabled distribution and scalability of computational services and/or resources across virtual networks. Cloud accounts are used to manage and operate cloud deployments that are deployed across such virtual networks. A cloud account is a subscription to a cloud service provider for an organization that corresponds to a group or line of business. An organization can have one or more users who have access to all resources and services associated with a cloud account and can grant access to additional users. The users can manage cloud services of deployments belonging to the cloud account.

Figure 1:
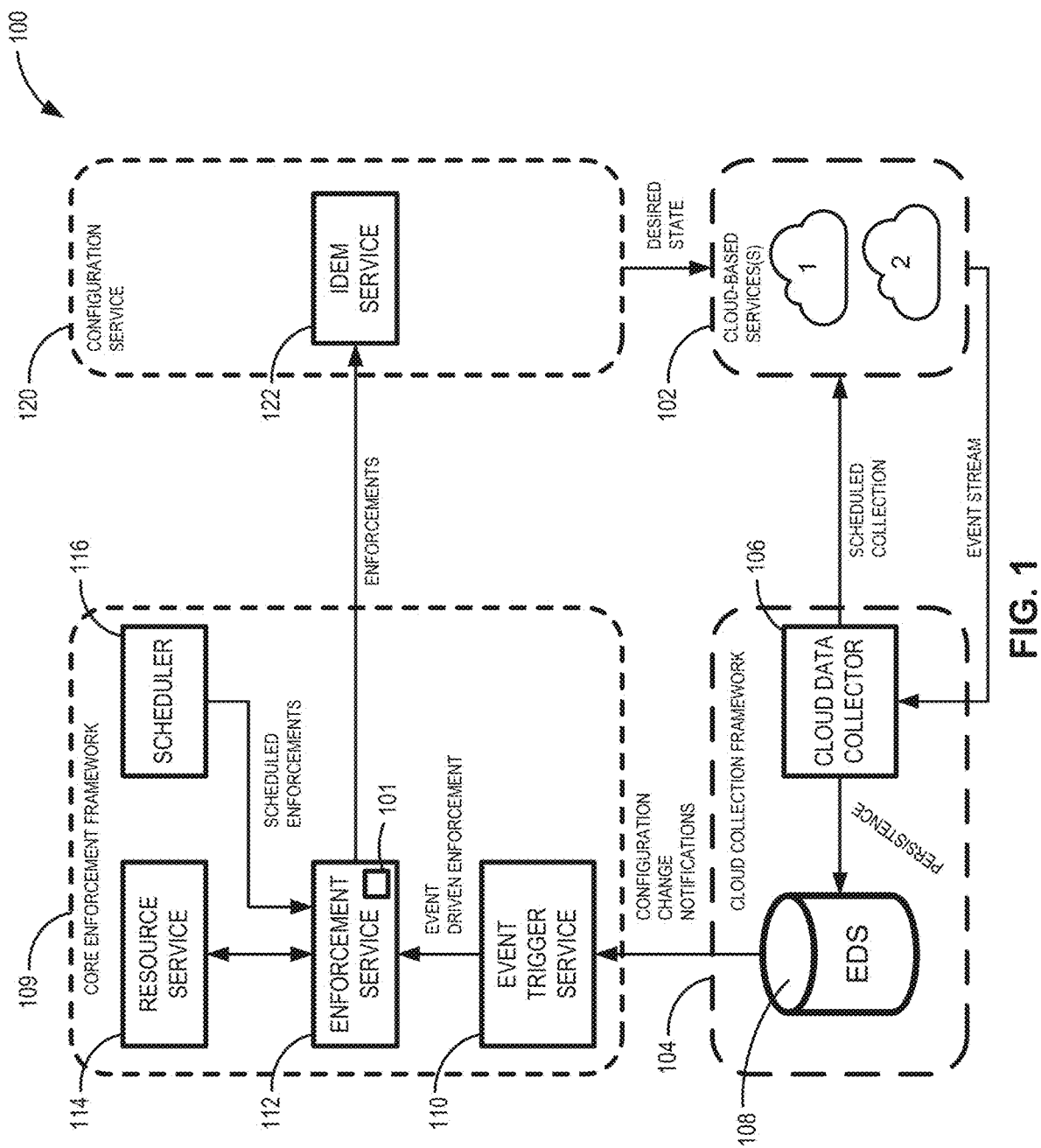
FIG. 1 is a block diagram of an example environment in which an example privilege validation service operates to validate privileges of cloud accounts for performing privileged operations on cloud resources.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

As used herein "substantially real time" refers to occurrence in a near instantaneous manner recognizing there may be real world delays for computing time, transmission, etc. Thus, unless otherwise specified, "substantially real time" refers to being within one second of real time.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (I) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

DETAILED DESCRIPTION

Cloud accounts are created for specific cloud providers and can be accessed through tools or services that provide a wide range of functionality. End users can implement such services to create templates for managing, provisioning, deploying, governing, scaling, and/or enforcing deployments across the variety of cloud regions associated with their cloud accounts. For example, the users can define and enforce a target state or desired state for instances that are onboarded to a cloud network. A "target state" or "desired state" of a cloud deployment or virtual machine, as used herein, is a set of machine readable policies defining an arrangement or set-up (e.g., a configuration) of hardware (e.g., a central processing unit (CPU), memory, etc.) and/or software (e.g., operating systems, applications, etc.). Such machine readable policies can be based on performance tuning efforts, resource capacity reclamation (rightsizing), licensing requirements, and/or other business-related aspects. The target or desired state can be a configuration file based on JavaScript Object Notation (JSON) that includes settings for resource instances of the deployment, such as network configuration settings, storage settings, security settings, advanced settings, performance settings, etc. As used herein, a "template" is an Infrastructure as Code (IaC) service provided by a cloud tool (e.g., an IaC tool), service, or framework that a customer uses to create, modify, monitor, and/or remove cloud deployments from a virtual network of resources (e.g., virtual machines). A user can generate a template corresponding to a cloud account and use the template to manage resources associated with one or more cloud deployments of the cloud account. For example, the template can define policies for the target or desired states for resources of the cloud account and can be used to enforce the target or desired states on the resources of the cloud account. Such templates are referred to herein as "policy enforcement templates" or "guardrails templates."

In some examples, guardrails templates are idempotent files (e.g., SaLt State (SLS) files with ".sls" extensions) that provide ongoing governance for public cloud accounts. A guardrails service or enforcement service can apply the policy rules defined in the templates to the cloud accounts such that the target or desired state of the accounts continuously adhere to policies set forth in the guardrails template. Thus, guardrails templates ensure that cloud accounts comply with policies. As used herein, "policies" or "policy frameworks" are high-level rules, such as Center for Internet Security (CIS) benchmarks, Payment Card Industry (PCI) Data Security Standard, and so on, for security, cost, performance, and/or automation to be enforced on public cloud resources. These policies include preventive guardrails and detective guardrails in the form of idempotent files.

In some examples, guardrails or policy enforcement templates are run on cloud accounts to ensure that cloud accounts continuously comply with policies. An example enforcement service can return findings for the target states enforced or ran in the cloud accounts using the policy enforcement template. In some examples, the enforcement service also reports results including differences between the target states of the policy enforcement template and the actual states of the resources to which the policy enforcement template was deployed. In other words, to continuously govern a cloud account, an example enforcement service (1) runs or deploys a policy enforcement template to apply guardrails on resources of the account, (2) reviews findings regarding target states and actual states of the cloud account, and (3) monitors the guardrails and resolves drifts relative to the target states. As used herein, "drift" refers to deviations of resource states relative to the established guardrails policies. In some examples, to keep accounts compliant and ensure that drifts do not occur, line of business owners implement the example enforcement service to enforce guardrails on existing deployments on a recurring schedule. In some examples, an end user needs permission or sufficient privilege to view the drifts in a cloud account, access data of resources, create instances of resources, update property values of resources, and/or perform other cloud operations.

An example guardrails or enforcement service and/or another service can run guardrails or policy enforcement templates in a cloud account to deploy resources having certain parameters and/or policies based on a target state. The target state is formed from the combination of the template with environment-specific configuration data. Thus, in some examples, the policy enforcement template is reusable by combining it with different configuration data. However, before executing a target state and making changes to a particular cloud environment, it is helpful to run a test to observe changes that will be made from the execution of the policy enforcement template. In some examples, the enforcement service can validate template semantics prior to a run. In some examples, the enforcement service can "dry run" the application of a target state using the policy enforcement template. That is, an example enforcement service or an example idempotent service can run a policy enforcement template without making changes to the current state of the cloud account. Rather, the example enforcement service or the example idempotent service returns results indicating how much drift would be present in the resources if the policy enforcement template were applied.

However, testing the semantics of a policy enforcement template or performing a "dry run" of the policy enforcement template does not validate whether users of the cloud account have certain privileges or credentials to create or access cloud application programming interfaces (APIs) of resources deployed with the policy enforcement template. For example, a policy enforcement template can deploy or create multiple resources of a cloud account, but a user of the account may only have partial privileges to those resources. In some examples, during a run or application of the policy enforcement template, (1) resources are created in a public cloud, (2) credentials of the user are checked sequentially, and (3) the resources are made private when the credentials are validated. However, if, for example, the user does not have the proper credentials for one or more resources, those resources will remain public until the user gains the credentials (e.g., from a business or operations manager, team, etc.) and the template is re-run. Thus, some resources will be created which will be in an insecure state until the credentials are obtained, which may take some time (e.g., minutes, hours, days, etc.). That is, until the user provides the credentials and privileges of the user are verified, customer accounts remain in a state of risk, and resources under an unsecured state can be hacked and/or manipulated by an outside source, for example.

In addition, when a user has partial privileges and runs a policy enforcement template, the resource APIs may generate an error indicating that the user does not have the proper permissions to access one or more resources. In some examples, although the error message can state that the user is missing permissions to a first resource, the user may actually lack the proper credentials for a second resource on which the first resource depends. Thus, debugging must be performed on the template to determine for which resource(s) the user does not have permission. Such a debugging process can consume significant time and computing resources.

Resource permissions are validated sequentially. Thus, a user will be informed of missing credentials one at a time, not all at once. For example, when a user deploys a template to create an Amazon Web Services (AWS) simple storage services (S3) bucket, apply a policy on the S3 bucket, and modify data within the S3 bucket, the enforcement service and/or idempotent service may verify the user has creation-related permissions to create the S3 bucket but may generate a first resource API error indicating the user does not have policy-related permissions to apply the policy. The user will then have to submit a help ticket or request to their organization to get the policy-related permissions, obtain the credentials, and run the template again. Because permissions are validated sequentially, the example enforcement service and/or idempotent service may then verify the user has the creation-related permissions to create the S3 bucket and the policy-related permissions to apply the policy but may generate a second resource API error indicating the user does not have modification-related permissions to modify data within the S3 bucket. The user will then go through the same steps to obtain the modification-related permissions. Such a process consumes significant time, computing resources, and human resources all while the resources remain in a public cloud environment, which is insecure.

Thus, it would be advantageous for a user to be aware of cloud provider API permissions before running a template.

Examples disclosed herein perform validation of cloud provider API privileges. Disclosed examples generate a list indicating which resources associated with deployment of a policy enforcement template require permissions for a user to access, modify, create, update, and/or delete those resources. Thus, examples disclosed herein enable a user or customer of a cloud account to know in advance whether permissions for resources associated with the guardrails or policy enforcement template exist. Knowledge of whether such permissions exist allows the user to obtain the credentials before running the policy enforcement template. Obtaining the proper permissions in advance of running the templates ensures that (1) the deployed resources do not remain public and insecure for relatively long periods of time, (2) resource API errors are not generated at runtime, (3) debugging does not need to be performed on templates after resource API errors are received, and (4) multiple re-runs of the template to not need to be performed because of the sequential nature of permission validation.

FIG. 1 is a schematic block diagram of an example environment 100 in which an example privilege validation service 101 that operates to manage access and/or utilization of microservices of a distributed computing system can be implemented. In the illustrated example of FIG. 1, aspects and/or components of the environment 100 function as a system that manages operations and usage of at least one cloud-based service 102. The management of the operations can pertain to configuring settings, managing resource usage and/or managing access of the cloud-based service(s) 102. The example architecture shown in the example of FIG. 1 is only an example and any appropriate other architecture, network, control scheme, communication and/or data topology can be implemented instead.

According to examples disclosed herein, an example cloud collection framework 104 includes an example cloud data collector 106 to coordinate and communicate with the cloud-based service(s) 102. To that end, the example cloud data collector 106 can extract, receive and/or query information (e.g., components, metadata, services, service information) from the cloud-based service(s) 102. In this example, the cloud data collector 106 can request and/or direct the cloud-based service(s) 102 to provide information related to: (1) accounts utilizing the cloud-based service(s) 102, (2) at least one configuration of the cloud-based service(s) 102 and/or (3) services of the cloud-based service(s) 102. The request by the cloud data collector 106 to the cloud-based service(s) 102 can be driven by an occurrence of an event or performed on periodic or aperiodic timeframes and/or on a schedule. According to examples disclosed herein, the cloud-based service(s) 102 provide(s) data, requested changes, configuration information and/or updates associated with the cloud-based service(s) 102 to the cloud data collector 106 in response to a query from the cloud data collector 106 or without receiving a query from the cloud data collector 106. In some examples, the aforementioned data and/or updates provided to the cloud data collector 106 can include changes of a configuration of the cloud-based service(s) 102 and/or operational data of the cloud-based service(s) 102.

In this example, the aforementioned cloud collection framework 104 also includes an example entity data service (EDS) 108. The example EDS 108 can be implemented as a database, data store, database manager and/or database framework to store and/or collect data associated with the cloud-based service(s) 102. The example EDS 108 stores entity data of the cloud-based service(s) 102 in a normalized form (e.g., as a centralized repository). According to examples disclosed herein, the EDS 108 can provide any requested or proposed configuration change request to a core enforcement framework 109 which, in turn, includes an example event trigger service 110, an example enforcement service 112 that implements the aforementioned privilege validation service 101, an example resource service 114 and an example scheduler 116. For example, when an event occurs, such as a rule change and/or a configuration change corresponding to the cloud-based service(s) 102, a notification from the EDS 108 is provided to the event trigger service 110.

The event trigger service 110 of the illustrated example is implemented to direct enforcement, configuration changes and/or access to services (e.g., microservices) of the cloud-based service(s) 102. The example event trigger service 110 can map a configuration change event to a desired state of the cloud service(s). Accordingly, the example event trigger service 110 can direct control, usage and/or configuration of the cloud-based service(s) 102 via (or in conjunction with) the aforementioned enforcement service 112. In this example, the event trigger service 110 provides requests and/or commands pertaining to event-driven enforcement of the cloud-based service(s) 102 to the enforcement service 112. In some examples, the event trigger service 110 manages and/or directs changes to key value data stores. In some examples, the event trigger service 110 can utilize and/or implement a Kubernetes cluster.

The example enforcement service 112 determines, manages and provides enforcements (e.g., configuration changes, access changes, resource usage instructions, a desired state change, etc.) with respect to the cloud-based service(s) 102 to a configuration service 120 based on the event-driven enforcements and/or instructions received from the event trigger service 110. Additionally or alternatively, notifications (e.g., configuration change notifications), enforcements and/or instructions received from the resource service 114 and the scheduler 116 cause the enforcement service 112 to provide enforcements to the configuration service 120. In turn, the enforcements provided to the configuration service 120 are subsequently provided to the cloud-based service(s) 102 as desired state changes (e.g., desired state change instructions or directives).

In this example, the resource service 114 stores and/or manages operational data and/or settings of the cloud-based service(s) 102. In this example, the resource service 114 contains, analyzes and/or manages metadata of the cloud-based service(s) 102 that is utilized to manage the cloud-based service(s) 102. In particular, the metadata corresponds to settings, access information and/or configurations of the cloud-based service(s) 102, for example.

In some examples, the aforementioned scheduler 116 directs and/or manages scheduled implementations, configuration changes, enforcements and/or updates (e.g., periodic updates) of the cloud-based service(s) 102 via the example enforcement service 112 and the configuration service 120. For example, the scheduler 116 can schedule the enforcement service 112 to perform scheduled enforcements of the configuration service 120 which, in turn, controls and/or directs a desired state of the cloud-based service(s) 102.

To control, manage, enforce and/or direct operation of the cloud-based service(s) 102, as mentioned above, the example enforcement service 112 provides the enforcements to the configuration service 120. In this example, the configuration service 120 includes an idempotent (IDEM) service 122 that is distinct from the core enforcement framework 109 and, thus, the enforcement service 112. However, the IDEM service 122 can be integrated with the enforcement service 112 and/or the core enforcement framework 109 in other examples. In the illustrated example of FIG. 1, the IDEM service 122 is an implementation/provisioning engine that implements desired state changes with respect to the cloud-based service(s) 102. In other words, the IDEM service 122 controls a desired state of the cloud-based service(s) 102 based on enforcements provided from the enforcement service 112. While the privilege validation service 101 is shown implemented in the example enforcement service 112, additionally or alternatively, the privilege validation service 101 can be implemented in the event trigger service 110, the resource service 114, the scheduler 116, and/or the IDEM service 122.

As mentioned above, any appropriate data topology, architecture and/or structure can be implemented instead. Further, any of the aforementioned aspects and/or elements described in connection with FIG. 1 can be combined or separated as appropriate. Further, while examples disclosed herein are shown in the context of cloud services, examples disclosed herein can be implemented in conjunction with any appropriate distributed and/or shared computing resource system.

Figure 2:
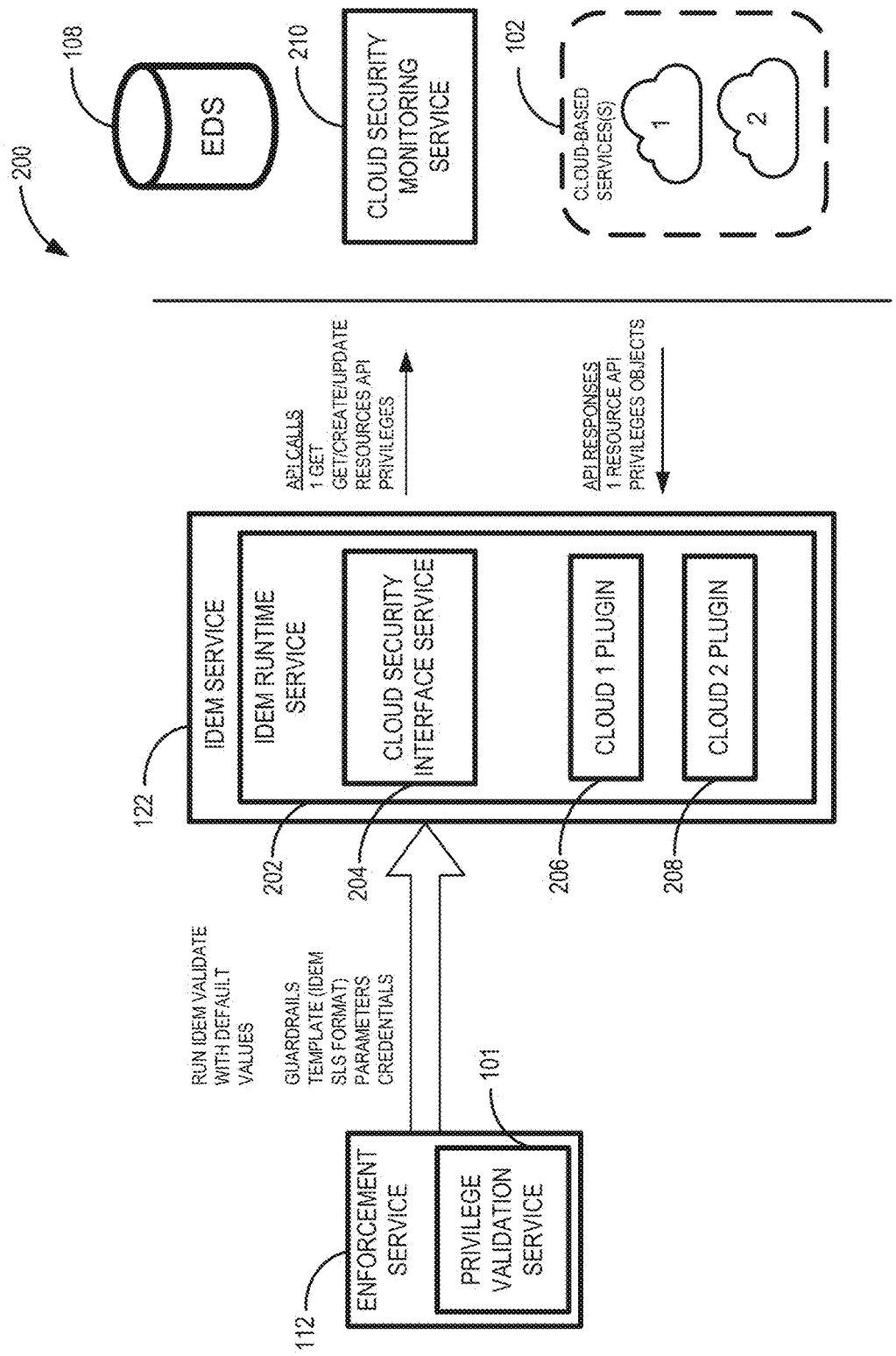
FIG. 2 is a block diagram of an example implementation of a privilege validation system that includes the privilege validation service of FIG. 1.

FIG. 2 is a block diagram of an example implementation of an example privilege validation system 200 that includes the privilege validation service 101 of FIG. 1 to validate permissions of cloud accounts for performing privileged operations on cloud resources. The example privilege validation service 101 of FIG. 2 may be instantiated (e.g., creating an instance of, bring into being for any length of time, materialize, implement, etc.) by programmable circuitry such as a Central Processor Unit (CPU) executing first instructions. Additionally or alternatively, the example privilege validation service 101 of FIG. 2 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers.

In the illustrated example of FIG. 2, the example privilege validation system 200 is implemented to enable the privilege validation service 101 and other services to conduct, instantiate, and/or execute permission validation during a permission validation phase as part of a larger policy enforcement template (or guardrails template) deployment process. In some examples, the privilege validation service 101 is instantiated by programmable circuitry executing permission validation instructions and/or configured to perform operations such as those represented by the flowcharts of FIGS. 3 and 4.

In examples disclosed herein, "permissions" or "privileges" refer to authorizations granted to cloud accounts and/or users of cloud accounts that provide access to cloud resources and/or the ability to perform operations on the cloud resources. For example, such permissions and/or privileges can enable a user to perform operations on cloud resources such as 'GET', 'ACCESS', 'CREATE', 'UPDATE', 'MODIFY', etc. In some examples, the user of the cloud account provides credentials to a cloud provider directly and/or via the IDEM service 122 to gain permissions and privileges to cloud resource operations.

In some examples, a cloud account deploys resources using a policy enforcement template. In examples disclosed herein, a policy enforcement template uses IaC to specify which resources to deploy and what operations to perform on those resources once deployed. For example, a 'GET' operation may be performed on a resource to obtain certain data for one or more processes. In addition, a 'CREATE' operation may be performed on a resource to create or add instances of workloads on the resource. Additionally, an 'UPDATE' operation may be performed on a resource to change resource property values in a resource type schema corresponding to the resource. For example, the resource type schema can include a property requirement, valid property values, and property constraints.

In some examples, a deployment process for a policy enforcement template of a cloud account includes (1) validating the policy enforcement template, (2) validating permissions of the cloud account associated with resources set forth in the policy enforcement template, and (3) deploying the resources using the policy enforcement template. In some examples, the enforcement service 112 causes the IDEM service 122 to validate the policy enforcement template as an initial step. For example, the enforcement service 112 can (1) provide the template (e.g., in an IDEM .sls format) with certain parameters and credentials and (2) command the IDEM service 122 to run a validation procedure with default values (e.g., resource property values). In some examples, the enforcement service 112 provides the template and credentials to the IDEM service 122 to execute the validation of the template. In some examples, the enforcement service 112 is instantiated by programmable circuitry executing enforcement instructions and/or configured to perform operations such as those represented by the flowcharts of FIGS. 3 and 4.

In some examples, the example privilege validation service 101 causes and/or instantiates the IDEM service 122 and other services/components to validate permissions of the cloud account in response to validation of the template. Furthermore, in some examples, the example IDEM service 122 creates a target resource configuration state (e.g., a desired state) across the deployment in response to validation of the permissions of the cloud account.

In the illustrated example of FIG. 2, the privilege validation system 200 includes the IDEM service 112 to validate the policy enforcement template and create a desired state (or target resource configuration state) in the deployed resources defined in the policy enforcement template. For example, the IDEM service 112 obtains a command and/or request from the enforcement service 112 to apply a policy enforcement template on a cloud network to deploy resources types specified in the policy enforcement template. In some examples, the IDEM service 112 is instantiated by programmable circuitry executing IDEM instructions and/or configured to perform operations such as those represented by the flowcharts of FIGS. 3 and 4.

In some examples, the policy enforcement template includes information specifying the types of resources to deploy, the workloads to deploy on those resources, the configurations to be implemented on those resources, etc. Thus, the policy enforcement template is IaC defining a schema to set the parameters of the resources. In some examples, the template also includes the credentials associated with the cloud account that grant permissions to resources and/or resource operations. To properly deploy the resources, the template is to include proper syntax in the IaC so that the resources are correctly deployed. Attempting to deploy the template without the proper syntax can cause the example IDEM service 122 to return an error indicating the deployment attempt has failed. For example, a syntax error can include an incorrect character or term added to a function statement and/or a character or term missing from a function statement. Thus, the example IDEM service 122 checks the syntax of the IaC to validate the template and to ensure that no detectable mistakes are present that would cause a deployment to fail.

In the illustrated example of FIG. 2, the privilege validation system 200 includes the privilege validation service 101 to cause the IDEM service 122 and/or other services to validate permissions of a cloud account. In some examples, the permissions correspond to cloud provider API privileges that are required to access, create, and/or update deployed resources of the cloud provider. In some examples, the privilege validation service 101 obtains credentials of the cloud account and determines permissions/privileges of the cloud account based on the credentials. For example, the privilege validation service 101 can determine whether a resource and/or resource operation of the template is private (e.g., requires authorization) and whether the cloud account has credentials associated with the resource and/or resource operation. Additionally or alternatively, the privilege validation service 101 obtains present permissions and/or privileges of the cloud account from the enforcement service 112 and/or the policy enforcement template. In such examples, the privilege validation service 101 can provide the present privileges/permissions to the IDEM service 122. In some examples, the privilege validation service 101 is instantiated by programmable circuitry executing permission validation instructions and/or configured to perform operations such as those represented by the flowcharts of FIGS. 3 and 4.

In some examples, the example privilege validation service 101 provides the policy enforcement template to the IDEM service 122. The template is associated with a cloud application to be deployed by the IDEM service 122. In some examples, the template includes the present privileges and/or credentials of the cloud account corresponding to particular resource types of the cloud application. In some examples, the privilege validation service 101 provides the IDEM service 122 with a list of the credentials that the cloud account possesses.

In the illustrated example of FIG. 2, the privilege validation system 200 includes an IDEM runtime service 202 to create and/or execute desired states (e.g., target resource configuration states) on deployed resources. The example IDEM runtime service 202 also enables plugins to run in the example privilege validation system 200 via the IDEM service 122. For example, the IDEM runtime service 202 can implement an example cloud security interface service 204, an example first cloud provider plugin 206, and an example second cloud provider plugin 208 via the IDEM service 122.

In the illustrated example of FIG. 2, the privilege validation system 200 includes the cloud security interface service 204 to enable a user of the cloud account to communicate, interface, and/or interact with an example cloud security monitoring service 210. For example, the cloud security interface service 204 can transmit an API call to get privileges for performing 'GET', 'CREATE', and 'UPDATE' operations on a resource. That is, the example cloud security interface service 204 can issue an API call and/or request to be granted privileges for use with cloud provider APIs corresponding to resources to be deployed using the template. In some examples, the cloud security interface service 204 can send a request to a cloud provider to obtain current privileges of a cloud account to access resources of that cloud provider. In some examples, the cloud security interface service 204 is instantiated by programmable circuitry executing cloud security interface instructions and/or configured to perform operations such as those represented by the flowcharts of FIGS. 3 and 4.

In some examples, the cloud security interface service 204 determines resources to be deployed from the template and sends an API call to a resource API of each one of the resources to be deployed. The example cloud security interface service 204 can also determine the current privileges of the cloud account based on the credentials provided by the privilege validation service 101. The example cloud security interface service 204 can then provide the current privileges of the cloud account to the example cloud security monitoring service 210 via the API call. In some examples, the cloud security interface service 204 obtains the current privileges from the enforcement service 112 and/or the IDEM service 122. Although, the example cloud security interface service 204 can obtain the current privileges from the privilege validation service 101 to include in the API call in other examples.

In the illustrated example of FIG. 2, the privilege validation system 200 includes the cloud security monitoring service 210 to obtain privileges (also referred to herein as "template privileges") that are required to access resources. For example, the cloud security monitoring service 210 can obtain such privileges based on cloud account data provided by the cloud security interface service 204. In some examples, the cloud security monitoring service 210 can also obtain privileges that the cloud account has previously been granted (also referred to herein as "present privileges") based on credentials included in the cloud account data. In the illustrated example, the cloud account data of the API call includes the present privileges of the cloud account. For example, the present privileges in the cloud account data can indicate resource APIs and credentials (e.g., passwords, keys, codes, etc.) that grant accesses to the resource APIs. Thus, the present privileges are established in advance of a permission validation phase and enable a cloud application to perform operations with deployed resources. In some examples, the cloud security monitoring service 210 is instantiated by programmable circuitry executing cloud security monitoring instructions and/or configured to perform operations such as those represented by the flowcharts of FIGS. 3 and 4.

In some examples, the cloud security monitoring service 210 accesses configuration settings, configuration changes, and threat events to help detect vulnerabilities and find suspicious activity in public cloud environments. The example cloud security monitoring service 210 can provide the IDEM service 122 with automated security insights, compliance assessments, and alerts that help to detect vulnerabilities and threats. Thus, to ensure that security is properly monitored, the example cloud security monitoring service 210 is aware of cloud provider API security privileges that are protected with credentials. That is, the example cloud security monitoring service 210 can determine which resource APIs (e.g., 'GET', 'CREATE', and/or 'UPDATE' operations) are privileged or protected using credentials granted to authorized parties, users, teams, cloud accounts, etc.

In the illustrated example, the cloud security monitoring service 210 obtains the present privileges of the cloud account from the cloud security interface service 204 via the API call. In some examples, the cloud security monitoring service 210 obtains cloud account credentials from the API call and determines whether the cloud account has certain privileges based on the credentials and the resource APIs specified in the API call and/or the template.

In some examples, the cloud security monitoring service 210 compares the present privileges of the cloud account and the template privileges of the cloud resources. To determine the template privileges, the example cloud security monitoring service 210 accesses cloud data indicating which resource APIs of the cloud provider are private or privileged (e.g., password protected). In some examples, the cloud security monitoring service 210 directly obtains the cloud data from databases managed by the cloud providers 102. In other examples, the cloud security monitoring service 210 accesses privileges stored in the entity data service (EDS) 108. That is, the example cloud data collector 106 can obtain template privileges of the cloud provider APIs and store the template privileges in the EDS 108.

In some examples, the cloud security monitoring service 210 can transmit an API response to the cloud security interface service 204 following a comparison of the template privileges and the present privileges. For example, the cloud security monitoring service 210 can fire the API response including the template privileges and the present privileges for performing 'GET', 'CREATE', and 'UPDATE' operations on resources associated with the policy enforcement template. The example cloud security interface service 204 can receive and/or obtain the API response from the cloud security monitoring service 210 and forward the template privileges and current privileges to the example privilege validation service 101. In some examples, the privilege validation service 101 obtains the required and present privileges in response to an event indicating the API response is received.

The example privilege validation service 101 can compare the template privileges and the present privileges. In the illustrated example of FIG. 2, the privilege validation service 101 receives the template privileges and the present privileges from the cloud security monitoring service 210 and/or the IDEM service 122. Alternatively, in other examples, the privilege validation service 101 determines the present privileges based on credentials of the cloud account and the resources of the cloud provider API that require credentials. In some examples, the resource and/or resource operations that require permissions or privileges for access are specified in the template.

The example privilege validation service 101 generates a list including the template privileges and the present privileges. In some examples, the list is a data structure identifying the resource API (e.g., an API for a password-protected resource and/or a resource operation), the template privileges of the resource API, and the present privileges corresponding to the resource API, when the cloud account has the present privileges. The example privilege validation service 101 determines whether the present privileges match the template privileges. For example, the privilege validation service 101 can determine whether a first value corresponding to a number of the present privileges equals a second value corresponding to a number of the template privileges. Additionally or alternatively, the example privilege validation service 101 can query a row of the list corresponding to a certain resource API, determine whether a present privilege exists for the resource API, increment a counter when the present privilege exists, repeat for each row/resource API in the list, and determine whether the counter value matches the number of rows (e.g., number of resource APIs) in the list.

In some examples, when the privilege validation service 101 determines that the present privileges do not match the template privileges, the privilege validation service 101 generates an error indicating the missing permissions. That is, the privilege validation service 101 can notify the user that there are template privileges for which the cloud account does not have proper credentials to obtain the privileges. In some examples, the error is a message or notification that displays the number of errors and the resource APIs associated with the missing permissions.

In the illustrated example of FIG. 2, the privilege validation system 200 includes the first cloud provider plugin 206 (e.g., an AWS plugin) and the second cloud provider plugin 208 (e.g., an Azure plugin) to enable the user of the cloud account to provide credentials corresponding to the required permissions and/or the missing permissions. For example, when the privilege validation service 101 notifies the user of the missing permissions, the user can raise a ticket or request with their organization to obtain the proper credentials. Once obtained, the user can provide credentials as user input via the first cloud provider plugin 206 and/or the second cloud provider plugin 208 to the cloud provider and gain the template privileges to use the resources. In some examples, one of the deployments of the cloud account uses a single cloud environment, and thus, the user uses one of the first cloud provider plugin 206 or the second cloud provider plugin 208 to enter the credentials. In other examples, the deployment is instantiated in a multi-cloud environment and provisions resources from the first and second cloud providers. In such examples, the user can use the first and second cloud provider plugins 206, 208 to enter the credentials, when appropriate.

In some examples, when the privilege validation service 101 determines that the present privileges match the template privileges, the privilege validation service 101 validates the present privileges relative to the template privileges specified in the policy enforcement template. That is, the example privilege validation service 101 can confirm that the privileges specified in the template are permitted to the cloud account. For example, the privilege validation service 101 can determine which credentials the cloud account obtained and whether those credentials were provided to the cloud provider(s) of template-specified resource(s) to gain privileged access to the resource API(s) or cloud provider API(s) of the resource(s).

In some examples, the IDEM service 122 imputes a privilege access condition to the resources based on the present privileges satisfying the template privileges. As used herein, the term "privilege access condition" refers to a statement that defines a circumstance under which a resource can be deployed in a secured state based on a cloud account having a privilege for the cloud provider API of the resource. Thus, a resource having a privilege access condition can be deployed in a secured state such that a cloud account having a template privilege (e.g., a required privilege) associated with the resource can access the deployed resource but another cloud account not having the template privilege cannot access the deployed resource. For example, the IDEM service 122 can create a privilege access condition and associate it with a resource so that the privilege validation service 101 can validate that the cloud account has a template privilege associated with the resource when the privilege access condition is true and/or imputed to the resource.

In some examples, when the privilege validation service 101 validates the present privileges relative to the template privileges, the IDEM service 122 procures the privileges that were missing from the template privileges based on the imputed privilege access condition. In some examples, the IDEM service 122 provides the privileges to the cloud provider of the resources based on the imputed privilege access condition. Thus, the IDEM service 122 can secure the resources of the template to which the privilege access condition was imputed and/or for which the privileges were acquired on behalf of the cloud account. In other words, the example IDEM service 122 secures the resources before deployment of the resources based on the privilege access condition being imputed to the resources and/or based on the privileges satisfying at least one of the template privileges.

In some examples, the privilege validation system 200 includes means for providing a template (e.g., a policy enforcement template, a guardrails template) and credentials to the IDEM service 122 of FIGS. 1 and 2 to execute (e.g., instantiate, command, request, etc.) validation of the template. For example, the means for providing may be implemented by enforcement service circuitry such as the enforcement service 112 of FIGS. 1 and 2. In some examples, the enforcement service 112 may be instantiated by programmable circuitry such as the example programmable circuitry 512 of FIG. 5. For instance, the enforcement service 112 may be instantiated by the example microprocessor 600 of FIG. 6 executing machine executable instructions such as those implemented by at least block 302 of FIG. 3. In some examples, the enforcement service 112 may be instantiated by hardware logic circuitry, which may be implemented by an ASIC, XPU, or the FPGA circuitry 700 of FIG. 7 configured and/or structured to perform operations corresponding to the machine readable instructions. Additionally or alternatively, the enforcement service 112 may be instantiated by any other combination of hardware, software, and/or firmware. For example, the enforcement service 112 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the privilege validation system 200 includes means for validating the template of the cloud account and/or creating target resource configuration states based on the template. For example, the means for validating and/or creating may be implemented by IDEM service circuitry such as the IDEM service 122 of FIGS. 1 and 2. In some examples, the IDEM service 122 may be instantiated by programmable circuitry such as the example programmable circuitry 512 of FIG. 5. For instance, the privilege validation service 101 may be instantiated by the example microprocessor 600 of FIG. 6 executing machine executable instructions such as those implemented by at least blocks 304, 316, 318, 320 of FIG. 3. In some examples, the IDEM service 122 may be instantiated by hardware logic circuitry, which may be implemented by an ASIC, XPU, or the FPGA circuitry 700 of FIG. 7 configured and/or structured to perform operations corresponding to the machine readable instructions. Additionally or alternatively, the IDEM service 122 may be instantiated by any other combination of hardware, software, and/or firmware. For example, the IDEM service 122 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the privilege validation system 200 includes means for validating permissions and/or privileges to cloud provider APIs. For example, the means for validating may be implemented by permission validation service circuitry such as the privilege validation service 101 of FIGS. 1 and 2. In some examples, the privilege validation service 101 may be instantiated by programmable circuitry such as the example programmable circuitry 512 of FIG. 5. For instance, the privilege validation service 101 may be instantiated by the example microprocessor 600 of FIG. 6 executing machine executable instructions such as those implemented by at least blocks 306, 308, 310, 312, 314 of FIG. 3 and/or blocks 410, 412, 414 of FIG. 4. In some examples, the privilege validation service 101 may be instantiated by hardware logic circuitry, which may be implemented by an ASIC, XPU, or the FPGA circuitry 700 of FIG. 7 configured and/or structured to perform operations corresponding to the machine readable instructions. Additionally or alternatively, the privilege validation service 101 may be instantiated by any other combination of hardware, software, and/or firmware. For example, the privilege validation service 101 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the privilege validation system 200 includes means for transmitting API calls to get privileges for performing operations on resources to be deployed based on the template. For example, the means for transmitting may be implemented by cloud security interface service circuitry such as the cloud security interface service 204 of FIG. 2. In some examples, the cloud security interface service 204 may be instantiated by programmable circuitry such as the example programmable circuitry 512 of FIG. 5. For instance, the cloud security interface service 204 may be instantiated by the example microprocessor 600 of FIG. 6 executing machine executable instructions such as those implemented by at least blocks 402, 404 of FIG. 4. In some examples, the cloud security interface service 204 may be instantiated by hardware logic circuitry, which may be implemented by an ASIC, XPU, or the FPGA circuitry 700 of FIG. 7 configured and/or structured to perform operations corresponding to the machine readable instructions. Additionally or alternatively, the cloud security interface service 204 may be instantiated by any other combination of hardware, software, and/or firmware. For example, the cloud security interface service 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the privilege validation system 200 includes means for obtaining and/or causing transmission of template privileges for performing operations on resources to be deployed with the template. For example, the means for obtaining and/or transmitting may be implemented by cloud security monitoring service circuitry such as the cloud security monitoring service 210 of FIG. 2. In some examples, the cloud security monitoring service 210 may be instantiated by programmable circuitry such as the example programmable circuitry 512 of FIG. 5. For instance, the cloud security monitoring service 210 may be instantiated by the example microprocessor 600 of FIG. 6 executing machine executable instructions such as those implemented by at least blocks 406, 408 of FIG. 4. In some examples, the cloud security monitoring service 210 may be instantiated by hardware logic circuitry, which may be implemented by an ASIC, XPU, or the FPGA circuitry 700 of FIG. 7 configured and/or structured to perform operations corresponding to the machine readable instructions. Additionally or alternatively, the cloud security monitoring service 210 may be instantiated by any other combination of hardware, software, and/or firmware. For example, the cloud security monitoring service 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

While an example manner of implementing the privilege validation system 200 of FIG. 1 is illustrated in FIG. 2, one or more of the elements, processes, and/or devices illustrated in FIG. 2 may be combined, divided, re-arranged, omitted, eliminated, and/or implemented in any other way. Further, the example enforcement service 112, the example IDEM service 122, the example privilege validation service 101, the example cloud security interface service 204, the example first cloud plugin 206, the example second cloud plugin 208, the example cloud security monitoring service 210, and/or, more generally, the example privilege validation system 200 of FIG. 2, may be implemented by hardware alone or by hardware in combination with software and/or firmware. Thus, for example, any of the example enforcement service 112, the example IDEM service 122, the example privilege validation service 101, the example cloud security interface service 204, the example first cloud plugin 206, the example second cloud plugin 208, the example cloud security monitoring service 210, and/or, more generally, the example privilege validation system 200, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example privilege validation system 200 of FIG. 2 may include one or more elements, processes, and/or devices in addition to, or instead of, those illustrated in FIG. 2, and/or may include more than one of any or all of the illustrated elements, processes and devices.

Figure 3:
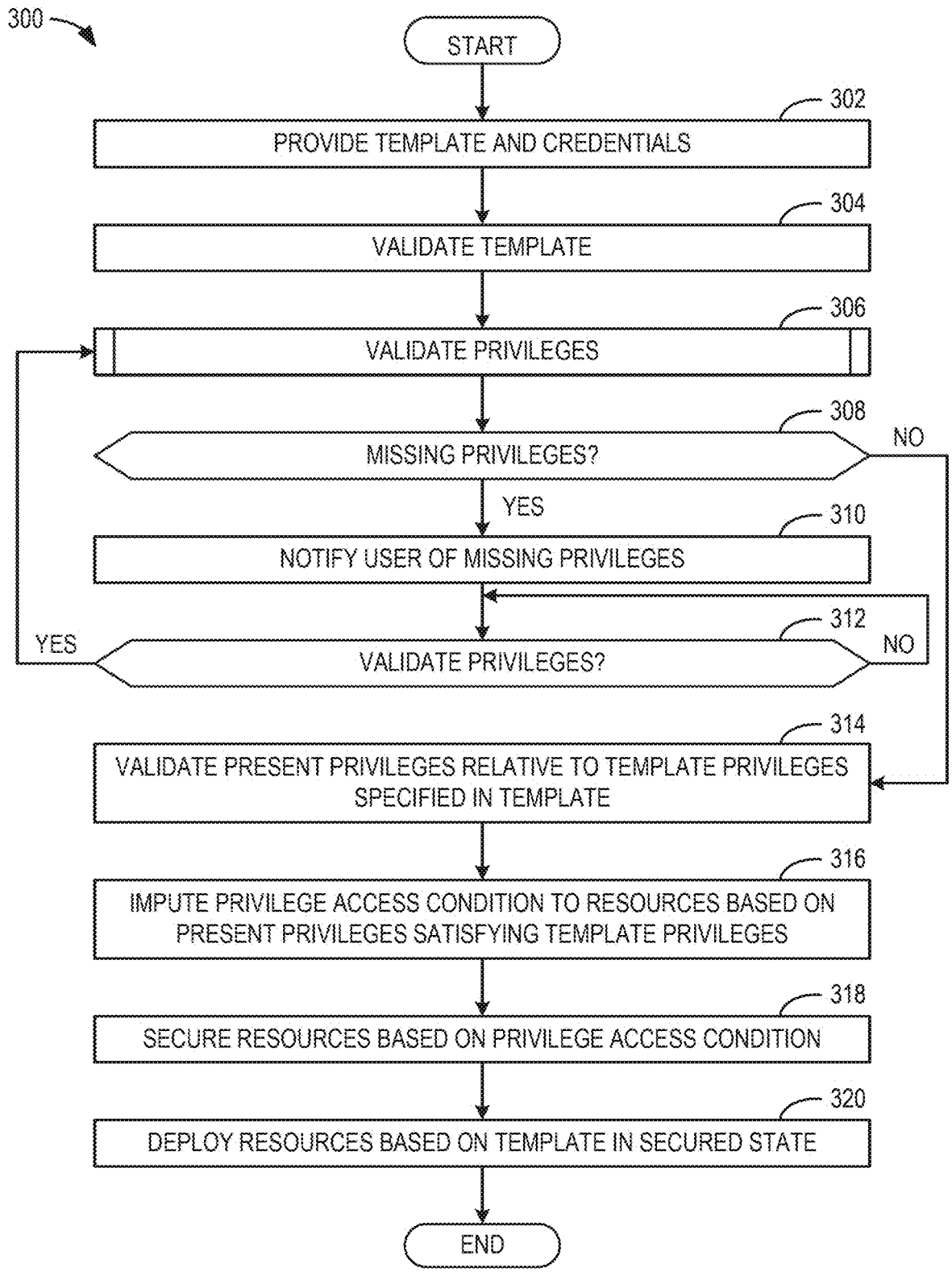
FIGS. 3 and 4 are flowcharts representative of example machine readable instructions and/or example operations that may be executed, instantiated, and/or performed by example programmable circuitry to implement the privilege validation system of FIG. 2.
Figure 4:
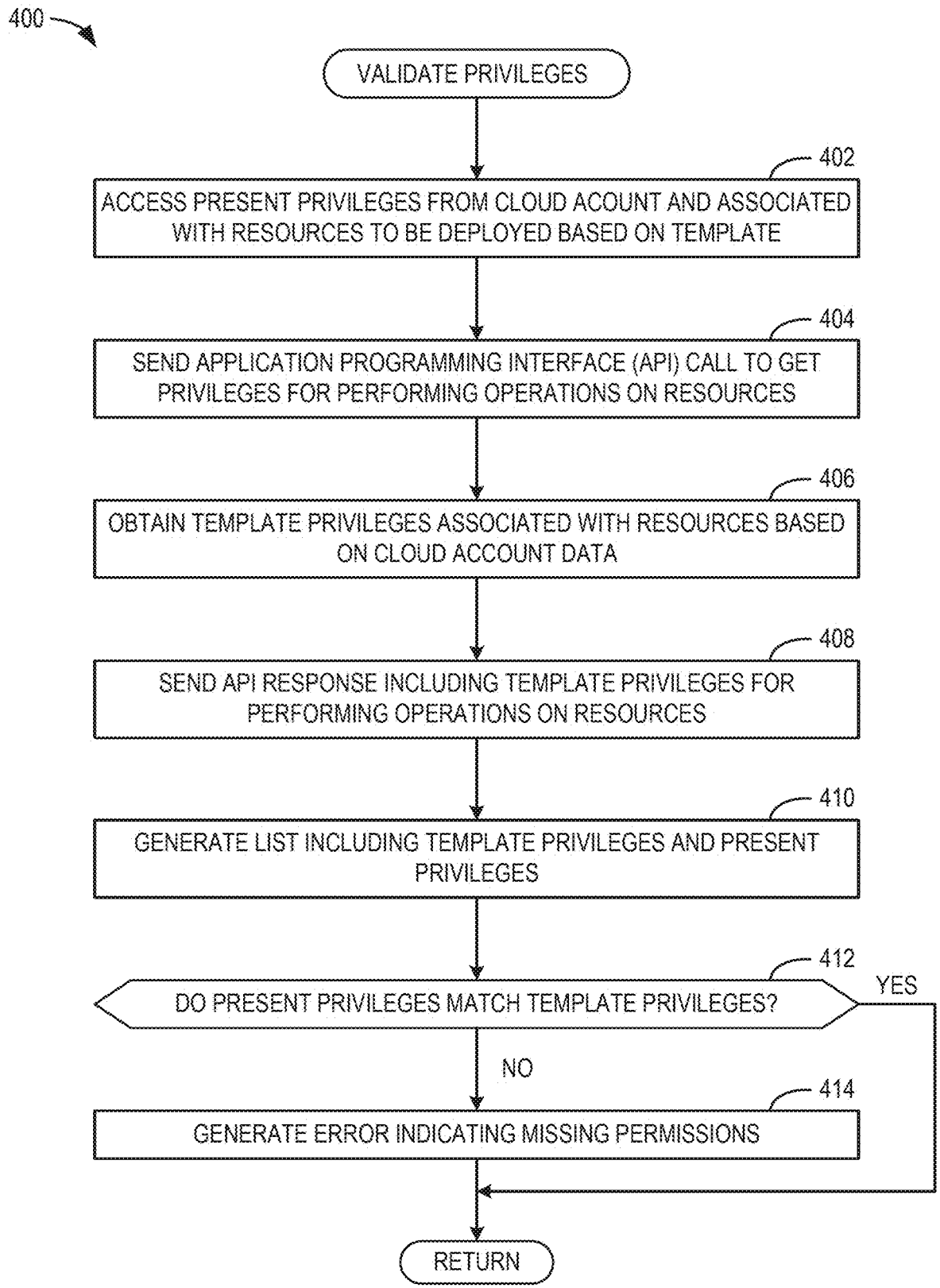

Flowcharts representative of example machine readable instructions, which may be executed by programmable circuitry to implement and/or instantiate the privilege validation system 200 of FIG. 2 and/or representative of example operations which may be performed by programmable circuitry to implement and/or instantiate the privilege validation system 200 of FIG. 2, are shown in FIGS. 3 and 4. The machine readable instructions may be one or more executable programs or portion(s) of one or more executable programs for execution by programmable circuitry such as the programmable circuitry 512 shown in the example processor platform 500 discussed below in connection with FIG. 5 and/or may be one or more function(s) or portion(s) of functions to be performed by the example programmable circuitry (e.g., an FPGA) discussed below in connection with FIGS. 6 and/or 7. In some examples, the machine readable instructions cause an operation, a task, etc., to be carried out and/or performed in an automated manner in the real world. As used herein, "automated" means without human involvement.

The program(s) may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entirety(ies) of the program(s) and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program(s) is/are described with reference to the flowcharts illustrated in FIGS. 3 and 4, many other methods of implementing the example privilege validation system 200 may alternatively be used. For example, the order of execution of the blocks of the flowcharts may be changed, and/or some of the blocks described may be changed, eliminated, or combined. Additionally or alternatively, any or all of the blocks of the flowchart(s) may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 3 and 4 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 3 is a flowchart representative of example machine readable instructions and/or example operations 300 that may be executed, instantiated, and/or performed by programmable circuitry to validate cloud provider API privileges. The example machine-readable instructions and/or the example operations 300 of FIG. 3 begin at block 302, at which the example enforcement service 112 of FIGS. 1 and 2 provides a policy enforcement template (e.g., a guardrails template, etc.) and credentials of a cloud account to an example IDEM service 122 of FIGS. 1 and 2. For example, the enforcement service 112 can provide the template including parameters set by a user of the cloud account. In addition, the example enforcement service 112 can assign default property values to template settings (e.g., attributes, parameters, etc.) for validation purposes but that may not be the actual values set upon deployment. In some examples, the enforcement service 112 obtains the credentials based on resource APIs and/or resource operations included in the template.

At block 304, the example IDEM service 122 validates the template. For example, the IDEM service 122 configures the template and detects syntax errors present in the template and/or a schema set forth in the template. In some examples, when the IDEM service 122 determines the template is invalid (e.g., one or more syntax errors present) the IDEM service 122 notifies the user, and the user can debug the error before proceeding.

At block 306, the example privilege validation service 101 of FIGS. 1 and 2 validates privileges corresponding to the template. That is, the example privilege validation service 101 determines whether the cloud account possesses the required privileges and/or permissions to perform resource operations set forth in the template. Example instructions and/or operations that may be used to implement block 306 are described below in connection with FIG. 4.

At block 308, the example privilege validation service 101 determines whether the cloud account is missing privileges required to instantiate operations on resources to be deployed using the template. For example, the privilege validation service 101 determines whether one or more error(s) were generated based on the operations of block 306. When privileges are not missing for the cloud account (block 308: NO), control proceeds to block 314. When privileges are missing for the cloud account (block 308: YES), control proceeds to block 310 at which the privilege validation service 101 notifies the user of the cloud account of the missing permissions. For example, the privilege validation service 101 can generate a message to indicate the missing privileges and/or to indicate the resource APIs corresponding to missing credentials that would be needed to grant the missing privileges.

In some examples, the user can submit a help ticket or request with their organization to obtain the required credentials based on the notification of block 310. The user can provide the credentials to the cloud provider to obtain the missing privileges/permissions. Thus, the cloud account of the user can acquire the template privileges that the cloud account is missing. At block 312, the example privilege validation service 101 determines whether to validate the privileges of the cloud account. For example, a user input validation command causes the privilege validation service 101 to reinitiate a privileges validation phase. When the privileges are not to be validated (block 312: NO), the privilege validation service 101 repeats the operation of block 312 to determine whether a validation command was provided to validate the privileges. Thus, the operation of block 312 can loop until revalidation of the privileges is triggered or until an interrupt causes control to exit the loop. When the example privilege validation service 101 determines that the privileges are to be validated (block 312: YES), control returns to block 306.

At block 314, the example privilege validation service 101 validates the present privileges relative to the template privileges specified in the template. For example, the privilege validation service 101 can confirm that the present privileges match the template privileges associated with the template. In some examples, the privilege validation service 101 determines which privileges were granted during the privilege validation phase based on the credentials the user obtained from their organization and provided to the cloud provider. The privilege validation service 101 can validate those privileges relative to the template privileges.

At block 316, the example IDEM service 122 of FIGS. 1 and 2 imputes a privilege access condition to the resources based on the present privileges satisfying the template privileges. For example, the IDEM service 122 acquires the privileges that were missing from the template privileges and/or provides the privileges to the cloud provider of the resources. Thus, the cloud account can deploy and access the resources in a secured state. In some examples, the IDEM service 122 provides credentials (e.g., passwords obtained from a security operator) to the cloud provider API and/or resource API to acquire the privileges and assign the privilege access condition to the resources.

At block 318, the example IDEM service 122 secures the resources based on the privilege access condition. In other words, the example IDEM service 122 secures the resources before deployment of the resources by imputing the privilege access condition to the resources based on the privilege satisfying at least one of the template privileges. For example, the IDEM service 122 ensures that the resources are to be deployed in a secured state using the policy enforcement template. Thus, the privilege access condition causes the deployed resources to be in a secured state that is accessible to users and/or cloud accounts that possess the privileges associated with the resources.

At block 320, the example IDEM service of FIGS. 1 and 2 deploys the resources based on the template in a secured state. For example, the IDEM service 122 deploys the resources of the template in response to the privilege validation service 101 determining that no privileges are missing for the cloud account. Thus, the IDEM service 122 can deploy the resources without private cloud resources being initiated as public due to missing credentials. In addition, the example IDEM service 122 can deploy the template without errors returning from the resources and/or the cloud providers due to missing credentials. In some examples, the IDEM service 122 also creates a target resource configuration state on the deployed resources set forth in the template. After block 320, the example instructions and/or operations 300 end.

FIG. 4 is a flowchart representative of example machine readable instructions and/or example operations 400 that may be executed, instantiated, and/or performed by programmable circuitry to validate permissions for the cloud account to perform operations on resources to be deployed using the template. The example instructions and/or operations 400 may be used to implement block 306 of FIG. 3. The example machine-readable instructions and/or the example operations 400 of FIG. 4 begin at block 402, at which the example cloud security interface service 204 accesses present privileges from the cloud account and associated with the resources to be deployed based on the policy enforcement template. For example, the cloud security interface service 204 can initially detect resource types and/or operations set forth in the template. In addition, the example cloud security interface service 204 can identify privileges based on the credentials of the cloud account. For example, the cloud security interface service 204 can identify which resource APIs are associated with the credentials. That is, the example cloud security interface service 204 can relate a resource API to a credential that allows the cloud account to 'GET', 'CREATE', and/or 'UPDATE' data/instances of the resource corresponding to the resource API. Thus, the example cloud security interface circuitry 204 can determine present privileges of the cloud account to access resource APIs to instantiate operations on resources corresponding to the resource APIs.

At block 404, the example cloud security interface service 204 sends an API call to get privileges for performing operations on resources to be deployed using the template. For example, the cloud security interface service 204 can implement the API call to request information indicating privileges required to instantiate workloads on the resources and/or resource types of the template. In some examples, the cloud security interface service 204 provides cloud account data in the API call including the present privileges of the cloud account. In addition, the cloud account data can include the resource APIs to which the cloud application of the template is to gain access using the credentials of the cloud account. In some examples, the cloud security interface service 204 sends the API call to the cloud security monitoring service 210. In some examples, the cloud security interface service 204 sends the API call to the cloud provider(s) associated with the resources of the template.

At block 406, the example cloud security monitoring service 210 of FIG. 2 obtains the template privileges associated with the resources based on the cloud account data retrieved from the API call. For example, the cloud security monitoring service 210 queries the EDS 108 to determine which one of the resource APIs in the cloud account data are private or protected using security credentials. In some examples, the cloud security monitoring service 210 requests the template privileges from the cloud provider APIs associated with the resources of the policy enforcement template. The template privileges can be a data structure and/or a list including the resource APIs for which credentials are requisite for performing operations on the resources associated with the resource APIs.

At block 408, the example cloud security monitoring service 210 sends an API response including the template privileges for performing operations on the resources. For example, the cloud security monitoring service 210 can package the template privileges in a data packet as a response to the API call and direct the transmission of data to the IDEM service 122 and/or the cloud security interface service 204. In some examples, the cloud security interface service 204 forwards the template privileges to the privilege validation service 101 in response to receiving the API response.

At block 410, the example privilege validation service 101 generates a list including the template privileges and the present privileges. For example, the privilege validation service 101 can generate a plain text table or a spreadsheet including rows having cells including an identifier or name of the resource API, whether access to the resource API requires a privilege, and whether the cloud account presently has the template privilege for the resource API.

At block 412, the example privilege validation service 101 determines whether the present privileges match the template privileges. For example, the privilege validation service 101 can determine whether rows of the generated list include a template privilege cell but not a present privilege cell. When the present privileges match the template privileges (block 412: YES), control returns to block 308 of FIG. 3 with an indicator or message indicating that there are no missing permissions for the cloud account.

When the present privileges do not match the template privileges (block 412: NO), control proceeds to block 414 at which the example privilege validation service 101 generates an error indicating the missing permissions. For example, the privilege validation service 101 can generate an error message including identifiers and/or names of the resource APIs for which the cloud account does not have permission(s) to access. In addition, the example privilege validation service 101 can implement the error message to generate a notification to be presented to the user of the cloud account. The example instructions and/or operations 400 of FIG. 4 end and control returns to block 308 of FIG. 3.

Figure 5:
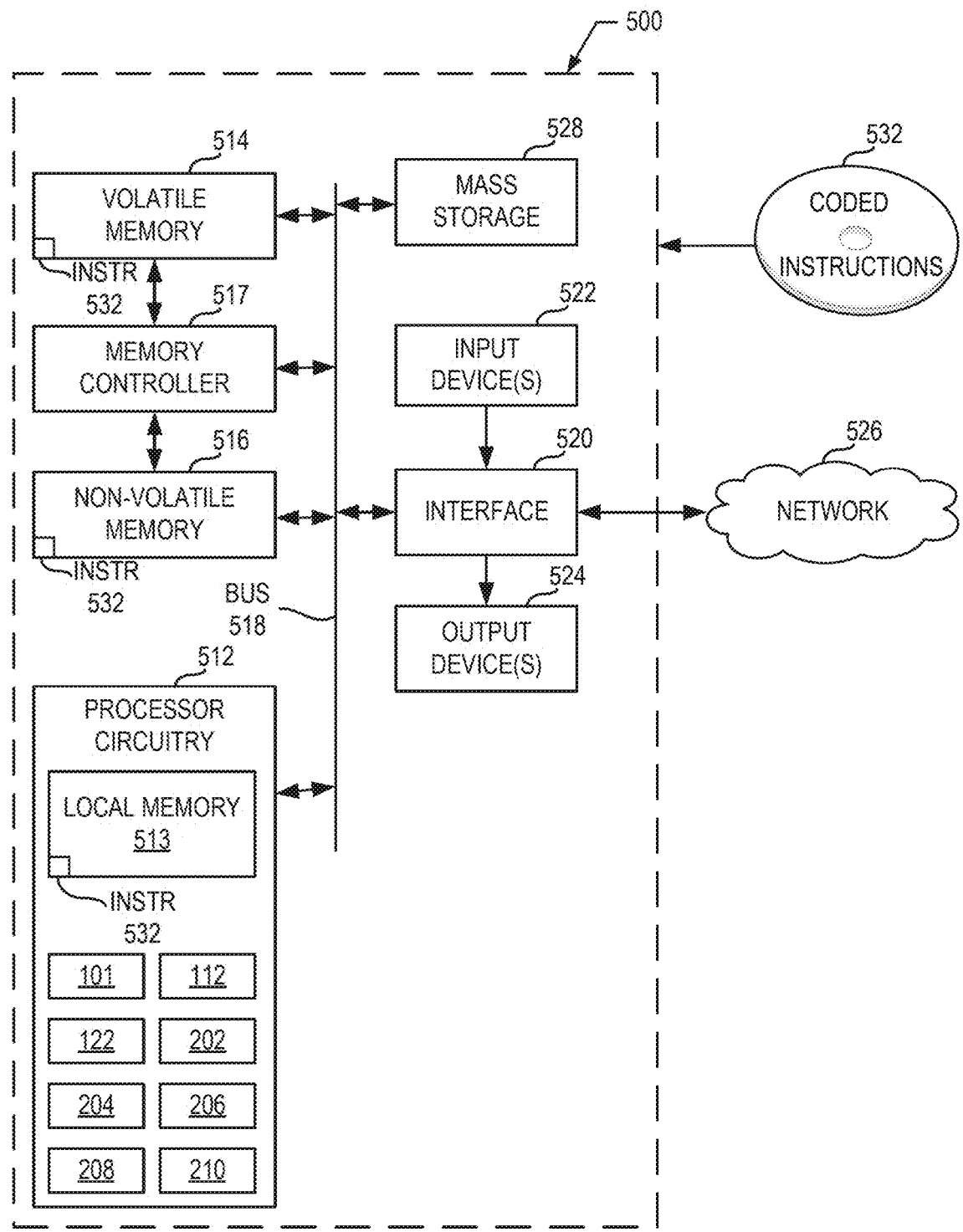
FIG. 5 is a block diagram of an example processing platform including programmable circuitry structured to execute, instantiate, and/or perform the example machine readable instructions and/or perform the example operations of FIGS. 3 and 4 to implement the privilege validation system of FIG. 2.

FIG. 5 is a block diagram of an example programmable circuitry platform 500 structured to execute and/or instantiate the example machine-readable instructions and/or the example operations of FIGS. 3 and 4 to implement the privilege validation system 200 of FIG. 2. The programmable circuitry platform 500 can be, for example, a server, a personal computer, a workstation, a self-learning machine (e.g., a neural network), or any other type of computing and/or electronic device.

The programmable circuitry platform 500 of the illustrated example includes programmable circuitry 512. The programmable circuitry 512 of the illustrated example is hardware. For example, the programmable circuitry 512 can be implemented by one or more integrated circuits, logic circuits, FPGAs, microprocessors, CPUs, GPUs, DSPs, and/or microcontrollers from any desired family or manufacturer. The programmable circuitry 512 may be implemented by one or more semiconductor based (e.g., silicon based) devices. In this example, the programmable circuitry 512 implements the example enforcement service 112, the example IDEM service 122, the example privilege validation service 101, the example cloud security interface service 204, the example first cloud plugin 206, the example second cloud plugin 208, the example cloud security monitoring service 210, and/or, more generally, the privilege validation system 200 of FIG. 2.

The programmable circuitry 512 of the illustrated example includes a local memory 513 (e.g., a cache, registers, etc.). The programmable circuitry 512 of the illustrated example is in communication with main memory 514, 516, which includes a volatile memory 514 and a non-volatile memory 516, by a bus 518. The volatile memory 514 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 516 may be implemented by flash memory and/or any other desired type of memory device. Access to the main memory 514, 516 of the illustrated example is controlled by a memory controller 517. In some examples, the memory controller 517 may be implemented by one or more integrated circuits, logic circuits, microcontrollers from any desired family or manufacturer, or any other type of circuitry to manage the flow of data going to and from the main memory 514, 516.

The programmable circuitry platform 500 of the illustrated example also includes interface circuitry 520. The interface circuitry 520 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 522 are connected to the interface circuitry 520. The input device(s) 522 permit(s) a user (e.g., a human user, a machine user, etc.) to enter data and/or commands into the programmable circuitry 512. The input device(s) 522 can be implemented by, for example, a keyboard, a button, a mouse, a touchscreen, a trackpad, a trackball, an isopoint device, and/or a voice recognition system.

One or more output devices 524 are also connected to the interface circuitry 520 of the illustrated example. The output device(s) 524 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.). The interface circuitry 520 of the illustrated example, thus, typically includes a graphics driver card, a graphics driver chip, and/or graphics processor circuitry such as a GPU.

The interface circuitry 520 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 526. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 500 of the illustrated example also includes one or more mass storage discs or devices 528 to store firmware, software, and/or data. Examples of such mass storage discs or devices 528 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 532, which may be implemented by the machine readable instructions of FIGS.

3 and 4, may be stored in the mass storage device 528, in the volatile memory 514, in the non-volatile memory 516, and/or on at least one non-transitory computer readable storage medium such as a CD or DVD which may be removable.

Figure 6:
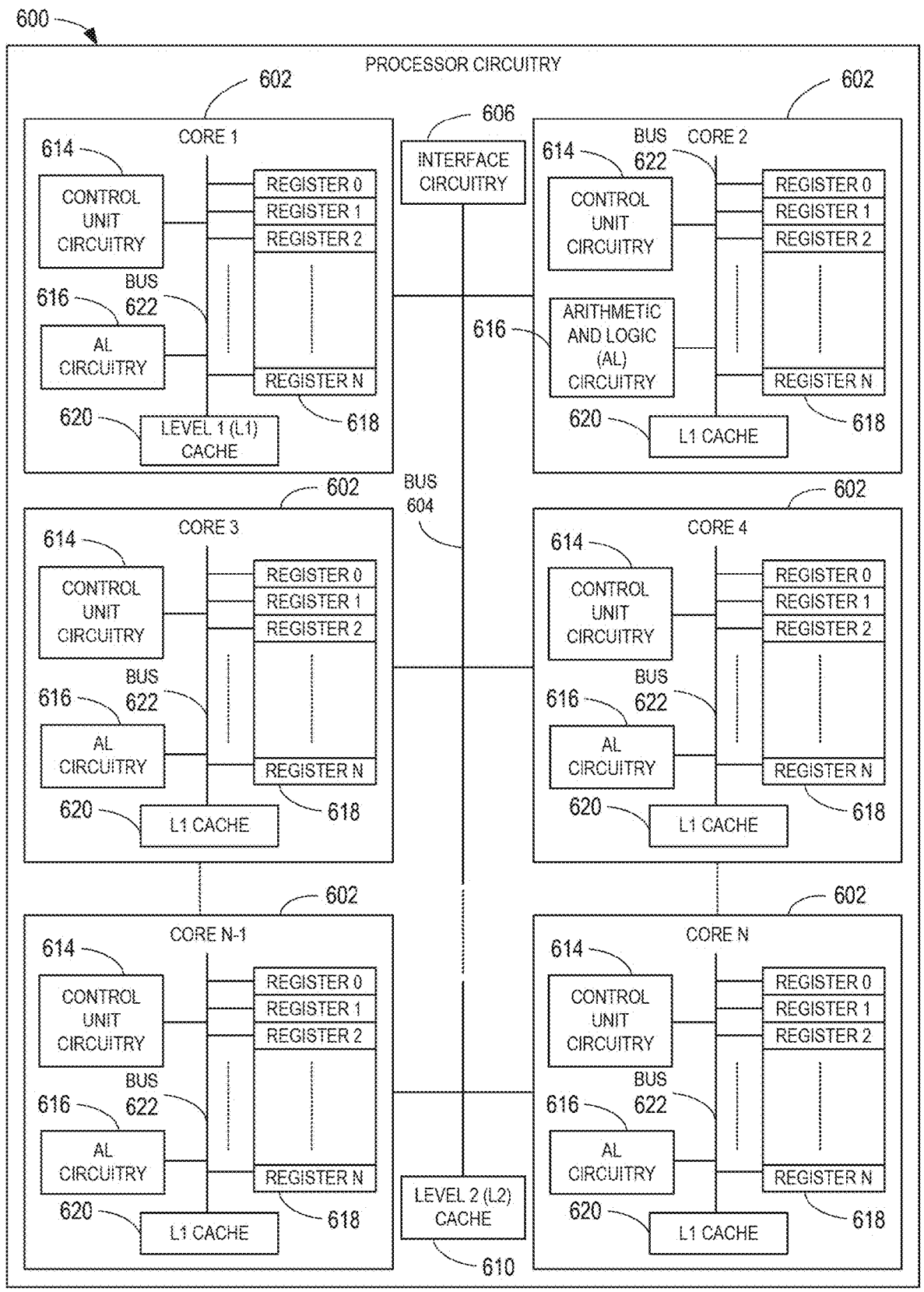
FIG. 6 is a block diagram of an example implementation of the programmable circuitry of FIG. 5.

FIG. 6 is a block diagram of an example implementation of the programmable circuitry 512 of FIG. 5. In this example, the programmable circuitry 512 of FIG. 5 is implemented by a microprocessor 600. For example, the microprocessor 600 may be a general-purpose microprocessor (e.g., general-purpose microprocessor circuitry). The microprocessor 600 executes some or all of the machine-readable instructions of the flowcharts of FIGS. 3 and 4 to effectively instantiate the circuitry of FIG. 2 as logic circuits to perform operations corresponding to those machine readable instructions. In some such examples, the circuitry of FIG. 2 is instantiated by the hardware circuits of the microprocessor 600 in combination with the machine-readable instructions. For example, the microprocessor 600 may be implemented by multi-core hardware circuitry such as a CPU, a DSP, a GPU, an XPU, etc. Although it may include any number of example cores 602 (e.g., 1 core), the microprocessor 600 of this example is a multi-core semiconductor device including N cores. The cores 602 of the microprocessor 600 may operate independently or may cooperate to execute machine readable instructions. For example, machine code corresponding to a firmware program, an embedded software program, or a software program may be executed by one of the cores 602 or may be executed by multiple ones of the cores 602 at the same or different times. In some examples, the machine code corresponding to the firmware program, the embedded software program, or the software program is split into threads and executed in parallel by two or more of the cores 602. The software program may correspond to a portion or all of the machine readable instructions and/or operations represented by the flowcharts of FIGS. 3 and 4.

The cores 602 may communicate by a first example bus 604. In some examples, the first bus 604 may be implemented by a communication bus to effectuate communication associated with one(s) of the cores 602. For example, the first bus 604 may be implemented by at least one of an Inter-Integrated Circuit (I2C) bus, a Serial Peripheral Interface (SPI) bus, a PCI bus, or a PCIe bus. Additionally or alternatively, the first bus 604 may be implemented by any other type of computing or electrical bus. The cores 602 may obtain data, instructions, and/or signals from one or more external devices by example interface circuitry 606. The cores 602 may output data, instructions, and/or signals to the one or more external devices by the interface circuitry 606. Although the cores 602 of this example include example local memory 620 (e.g., Level 1 (L1) cache that may be split into an L1 data cache and an L1 instruction cache), the microprocessor 600 also includes example shared memory 610 that may be shared by the cores (e.g., Level 2 (L2 cache)) for high-speed access to data and/or instructions. Data and/or instructions may be transferred (e.g., shared) by writing to and/or reading from the shared memory 610. The local memory 620 of each of the cores 602 and the shared memory 610 may be part of a hierarchy of storage devices including multiple levels of cache memory and the main memory (e.g., the main memory 514, 516 of FIG. 5). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 602 may be referred to as a CPU, DSP, GPU, etc., or any other type of hardware circuitry. Each core 602 includes control unit circuitry 614, arithmetic and logic (AL) circuitry (sometimes referred to as an ALU) 616, a plurality of registers 618, the local memory 620, and a second example bus 622. Other structures may be present. For example, each core 602 may include vector unit circuitry, single instruction multiple data (SIMD) unit circuitry, load/store unit (LSU) circuitry, branch/jump unit circuitry, floating-point unit (FPU) circuitry, etc. The control unit circuitry 614 includes semiconductor-based circuits structured to control (e.g., coordinate) data movement within the corresponding core 602. The AL circuitry 616 includes semiconductor-based circuits structured to perform one or more mathematic and/or logic operations on the data within the corresponding core 602. The AL circuitry 616 of some examples performs integer based operations. In other examples, the AL circuitry 616 also performs floating-point operations. In yet other examples, the AL circuitry 616 may include first AL circuitry that performs integer-based operations and second AL circuitry that performs floating-point operations. In some examples, the AL circuitry 616 may be referred to as an Arithmetic Logic Unit (ALU).

The registers 618 are semiconductor-based structures to store data and/or instructions such as results of one or more of the operations performed by the AL circuitry 616 of the corresponding core 602. For example, the registers 618 may include vector register(s), SIMD register(s), general-purpose register(s), flag register(s), segment register(s), machine-specific register(s), instruction pointer register(s), control register(s), debug register(s), memory management register(s), machine check register(s), etc. The registers 618 may be arranged in a bank as shown in FIG. 6. Alternatively, the registers 618 may be organized in any other arrangement, format, or structure, such as by being distributed throughout the core 602 to shorten access time. The second bus 622 may be implemented by at least one of an I2C bus, a SPI bus, a PCI bus, or a PCIe bus.

Each core 602 and/or, more generally, the microprocessor 600 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 600 is a semiconductor device fabricated to include many transistors interconnected to implement the structures described above in one or more integrated circuits (ICs) contained in one or more packages.

The microprocessor 600 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 600, in the same chip package as the microprocessor 600 and/or in one or more separate packages from the microprocessor 600.

Figure 7:
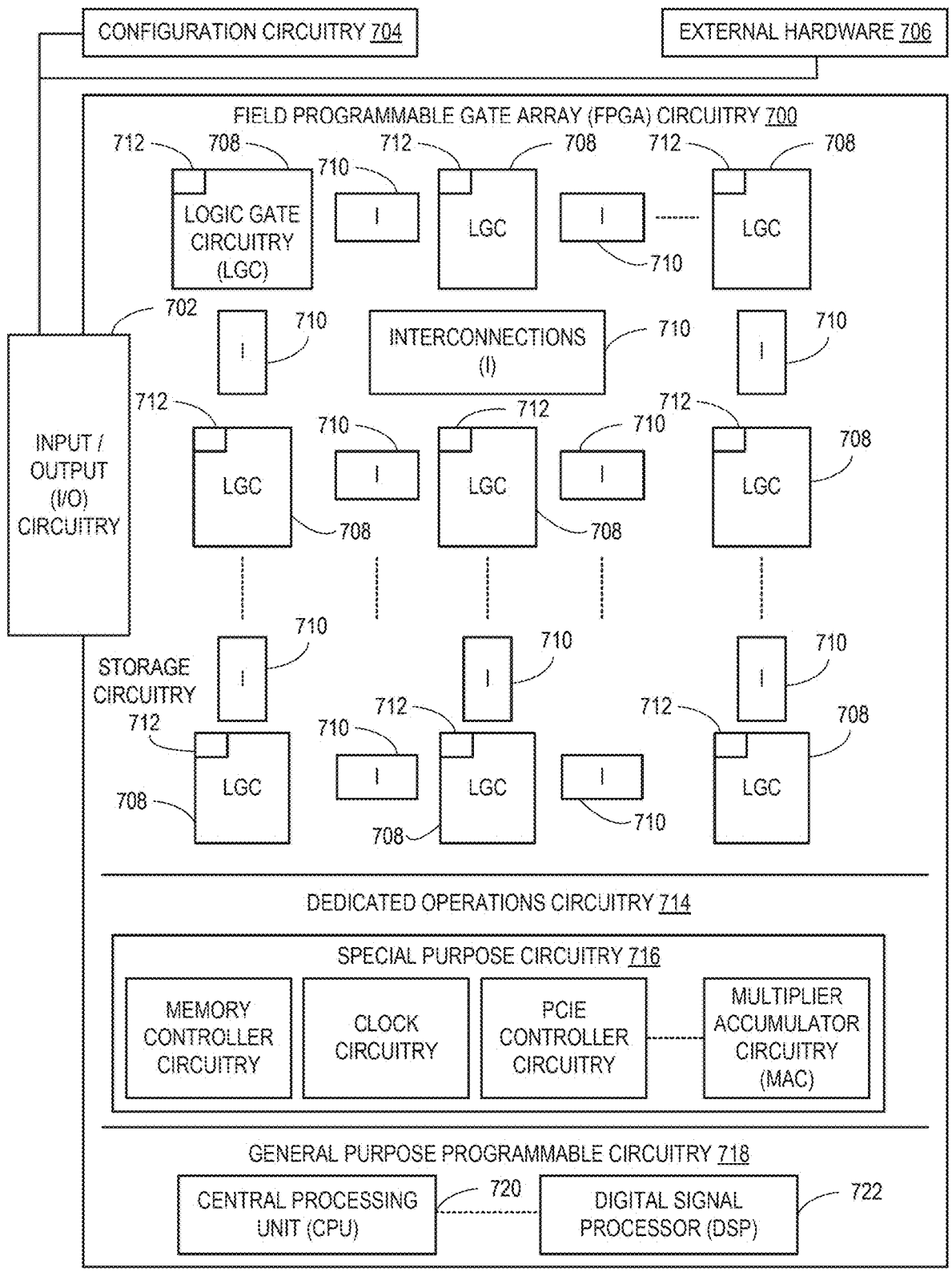
FIG. 7 is a block diagram of another example implementation of the programmable circuitry of FIG. 5.

FIG. 7 is a block diagram of another example implementation of the programmable circuitry 512 of FIG. 5. In this example, the programmable circuitry 512 is implemented by FPGA circuitry 700. For example, the FPGA circuitry 700 may be implemented by an FPGA. The FPGA circuitry 700 can be used, for example, to perform operations that could otherwise be performed by the example microprocessor 600 of FIG. 6 executing corresponding machine readable instructions. However, once configured, the FPGA circuitry 700 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 600 of FIG. 6 described above (which is a general purpose device that may be programmed to execute some or all of the machine readable instructions represented by the flowcharts of FIGS. 3 and 4 but whose interconnections and logic circuitry are fixed once fabricated), the FPGA circuitry 700 of the example of FIG. 7 includes interconnections and logic circuitry that may be configured, structured, programmed, and/or interconnected in different ways after fabrication to instantiate, for example, some or all of the operations/ functions corresponding to the machine readable instructions represented by the flowcharts of FIGS. 3 and 4. In particular, the FPGA circuitry 700 may be thought of as an array of logic gates, interconnections, and switches. The switches can be programmed to change how the logic gates are interconnected by the interconnections, effectively forming one or more dedicated logic circuits (unless and until the FPGA circuitry 700 is reprogrammed). The configured logic circuits enable the logic gates to cooperate in different ways to perform different operations on data received by input circuitry. Those operations may correspond to some or all of the instructions (e.g., the software and/or firmware) represented by the flowcharts of FIGS. 3 and 4. As such, the FPGA circuitry 700 may be configured and/or structured to effectively instantiate some or all of the operations/functions corresponding to the machine readable instructions of the flowcharts of FIGS. 3 and 4 as dedicated logic circuits to perform the operations/functions corresponding to those software instructions in a dedicated manner analogous to an ASIC. Therefore, the FPGA circuitry 700 may perform the operations/functions corresponding to the some or all of the machine readable instructions of FIGS. 3 and 4 faster than the general-purpose microprocessor can execute the same.

In the example of FIG. 7, the FPGA circuitry 700 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 700 of FIG. 7 may access and/or load the binary file to cause the FPGA circuitry 700 of FIG. 7 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 700 of FIG. 7 to cause configuration and/or structuring of the FPGA circuitry 700 of FIG. 7, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 700 of FIG. 7 may access and/or load the binary file to cause the FPGA circuitry 700 of FIG. 7 to be configured and/or structured to perform the one or more operations/ functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 700 of FIG. 7 to cause configuration and/or structuring of the FPGA circuitry 700 of FIG. 7, or portion(s) thereof.

The FPGA circuitry 700 of FIG. 7, includes example input/output (I/O) circuitry 702 to obtain and/or output data to/from example configuration circuitry 704 and/or external hardware 706. For example, the configuration circuitry 704 may be implemented by interface circuitry that may obtain a binary file, which may be implemented by a bit stream, data, and/or machine-readable instructions, to configure the FPGA circuitry 700, or portion(s) thereof. In some such examples, the configuration circuitry 704 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 706 may be implemented by external hardware circuitry. For example, the external hardware 706 may be implemented by the microprocessor 600 of FIG. 6.

The FPGA circuitry 700 also includes an array of example logic gate circuitry 708, a plurality of example configurable interconnections 710, and example storage circuitry 712. The logic gate circuitry 708 and the configurable interconnections 710 are configurable to instantiate one or more operations/functions that may correspond to at least some of the machine readable instructions of FIGS. 3 and 4 and/or other desired operations. The logic gate circuitry 708 shown in FIG. 7 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 708 to enable configuration of the electrical structures and/or the logic gates to form circuits to perform desired operations/ functions. The logic gate circuitry 708 may include other electrical structures such as look-up tables (LUTs), registers (e.g., flip-flops or latches), multiplexers, etc.

The configurable interconnections 710 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 708 to program desired logic circuits.

The storage circuitry 712 of the illustrated example is structured to store result(s) of the one or more of the operations performed by corresponding logic gates. The storage circuitry 712 may be implemented by registers or the like. In the illustrated example, the storage circuitry 712 is distributed amongst the logic gate circuitry 708 to facilitate access and increase execution speed.

The example FPGA circuitry 700 of FIG. 7 also includes example dedicated operations circuitry 714. In this example, the dedicated operations circuitry 714 includes special purpose circuitry 716 that may be invoked to implement commonly used functions to avoid the need to program those functions in the field. Examples of such special purpose circuitry 716 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 700 may also include example general purpose programmable circuitry 718 such as an example CPU 720 and/or an example DSP 722. Other general purpose programmable circuitry 718 may additionally or alternatively be present such as a GPU, an XPU, etc., that can be programmed to perform other operations.

Although FIGS. 6 and 7 illustrate two example implementations of the programmable circuitry 512 of FIG. 5, many other approaches are contemplated. For example, FPGA circuitry may include an on-board CPU, such as one or more of the example CPU 720 of FIG. 6. Therefore, the programmable circuitry 512 of FIG. 5 may additionally be implemented by combining at least the example microprocessor 600 of FIG. 6 and the example FPGA circuitry 700 of FIG. 7. In some such hybrid examples, one or more cores 602 of FIG. 6 may execute a first portion of the machine readable instructions represented by the flowcharts of FIGS. 3 and 4 to perform first operation(s)/function(s), the FPGA circuitry 700 of FIG. 7 may be configured and/or structured to perform second operation(s)/function(s) corresponding to a second portion of the machine readable instructions represented by the flowcharts of FIGS. 3 and 4, and/or an ASIC may be configured and/or structured to perform third operation(s)/function(s) corresponding to a third portion of the machine readable instructions represented by the flowcharts of FIGS. 3 and 4.

It should be understood that some or all of the circuitry of FIG. 2 may, thus, be instantiated at the same or different times. For example, same and/or different portion(s) of the microprocessor 600 of FIG. 6 may be programmed to execute portion(s) of machine-readable instructions at the same and/or different times. In some examples, same and/or different portion(s) of the FPGA circuitry 700 of FIG. 7 may be configured and/or structured to perform operations/functions corresponding to portion(s) of machine-readable instructions at the same and/or different times.

In some examples, some or all of the circuitry of FIG. 2 may be instantiated, for example, in one or more threads executing concurrently and/or in series. For example, the microprocessor 600 of FIG. 6 may execute machine readable instructions in one or more threads executing concurrently and/or in series. In some examples, the FPGA circuitry 700 of FIG. 7 may be configured and/or structured to carry out operations/functions concurrently and/or in series. Moreover, in some examples, some or all of the circuitry of FIG. 2 may be implemented within one or more virtual machines and/or containers executing on the microprocessor 600 of FIG. 6.

In some examples, the programmable circuitry 512 of FIG. 5 may be in one or more packages. For example, the microprocessor 600 of FIG. 6 and/or the FPGA circuitry 700 of FIG. 7 may be in one or more packages. In some examples, an XPU may be implemented by the programmable circuitry 512 of FIG. 5, which may be in one or more packages. For example, the XPU may include a CPU (e.g., the microprocessor 600 of FIG. 6, the CPU 720 of FIG. 7, etc.) in one package, a DSP (e.g., the DSP 722 of FIG. 7) in another package, a GPU in yet another package, and an FPGA (e.g., the FPGA circuitry 700 of FIG. 7) in still yet another package.

Figure 8:
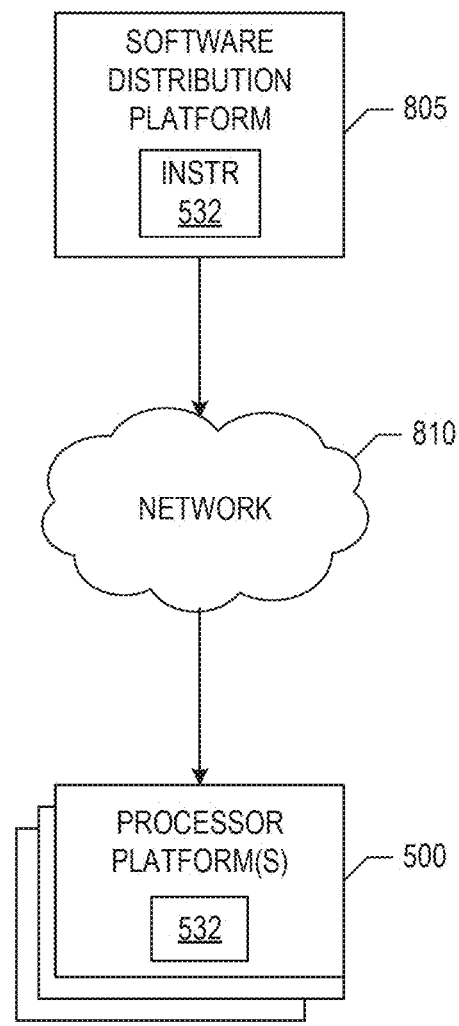
FIG. 8 is a block diagram of an example software/firmware/instructions distribution platform (e.g., one or more servers) to distribute software, instructions, and/or firmware (e.g., corresponding to the example machine readable instructions of FIGS. 3 and 4) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 805 to distribute software such as the example machine readable instructions 532 of FIG. 5 to other hardware devices (e.g., hardware devices owned and/or operated by third parties from the owner and/or operator of the software distribution platform) is illustrated in FIG. 8. The example software distribution platform 805 may be implemented by any computer server, data facility, cloud service, etc., capable of storing and transmitting software to other computing devices. The third parties may be customers of the entity owning and/or operating the software distribution platform 805. For example, the entity that owns and/or operates the software distribution platform 805 may be a developer, a seller, and/or a licensor of software such as the example machine readable instructions 532 of FIG. 5. The third parties may be consumers, users, retailers, OEMs, etc., who purchase and/or license the software for use and/or re-sale and/or sub-licensing. In the illustrated example, the software distribution platform 805 includes one or more servers and one or more storage devices. The storage devices store the machine readable instructions 532, which may correspond to the example machine readable instructions of FIGS. 3 and 4, as described above. The one or more servers of the example software distribution platform 805 are in communication with an example network 810, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 532 from the software distribution platform 805. For example, the software, which may correspond to the example machine readable instructions of FIGS. 3 and 4, may be downloaded to the example programmable circuitry platform 500, which is to execute the machine readable instructions 532 to implement the privilege validation system 200. In some examples, one or more servers of the software distribution platform 805 periodically offer, transmit, and/or force updates to the software (e.g., the example machine readable instructions 532 of FIG. 5) to ensure improvements, patches, updates, etc., are distributed and applied to the software at the end user devices. Although referred to as software above, the distributed "software" could alternatively be firmware.

From the foregoing, it will be appreciated that example systems, apparatus, articles of manufacture, and methods have been disclosed that validate cloud provider API privileges for resources deployed using a template, such as a policy enforcement template or guardrails template. Disclosed systems, apparatus, articles of manufacture, and methods improve the efficiency of using a computing device by providing users with knowledge of missing privileges prior to applying a desired or target state (or target resource configuration state) on resources of a cloud deployment.

Thus, customers can fill gaps in a security/operations system of an organization by identifying and requesting credentials prior to running a policy enforcement template. In addition, disclosed examples provide template privileges to run the desired or target state. Thus, the time to resolve privilege-related issues is significantly reduced. Additionally, deployed resources are not left in a public and unsecured state due to privileges missing from the cloud account at deployment. Disclosed systems, apparatus, articles of manufacture, and methods are accordingly directed to one or more improvement(s) in the operation of a machine such as a computer or other electronic and/or mechanical device.

Example methods, apparatus, systems, and articles of manufacture to validate cloud provider API privileges are disclosed herein. Further examples and combinations thereof include the following:

Example 1 includes an apparatus comprising interface circuitry, machine readable instructions, and programmable circuitry to at least one of instantiate or execute the machine readable instructions to access a privilege from a cloud account, the privilege associated with a resource to be deployed based on a template, validate the privilege relative to template privileges specified in the template, secure the resource before deployment of the resource by imputing a privilege access condition to the resource based on the privilege satisfying at least one of the template privileges, and deploy the resource based on the template in a secured state, the secured state corresponding to the privilege access condition.

Example 2 includes the apparatus of example 1, wherein the privilege corresponds to an authorization of the cloud account to access a resource application programming interface (API) of a cloud provider using a credential.

Example 3 includes the apparatus of example 2, wherein the programmable circuitry is to compare the credential to the resource API to validate the privilege.

Example 4 includes the apparatus of example 2, wherein the programmable circuitry is to transmit an API call to get the template privileges corresponding to the cloud provider to perform an operation on the resource.

Example 5 includes the apparatus of example 4, wherein the programmable circuitry is to obtain an API response including the template privileges, and compare the template privileges to a plurality of present privileges of the cloud account to validate the privilege, the privilege included in the plurality of present privileges.

Example 6 includes the apparatus of example 2, wherein the privilege is a first privilege, the resource is a first resource, the programmable circuitry is to validate a second privilege of the cloud account to secure a second resource before deployment of the second resource by imputing the privilege access condition to the second resource based on the second privilege satisfying at least one of the template privileges.

Example 7 includes the apparatus of example 6, wherein the programmable circuitry is to generate a notification indicating the second privilege is missing from the cloud account in response to the second privilege not being validated.

Example 8 includes a non-transitory machine readable storage medium comprising instructions to cause programmable circuitry to at least access a privilege from a cloud account, the privilege associated with a resource to be deployed based on a template, validate the privilege relative to template privileges corresponding to the template, secure the resource before deployment of the resource by imputing a privilege access condition to the resource based on the privilege satisfying at least one of the template privileges, and deploy the resource based on the template in a secured state, the secured state corresponding to the privilege access condition.

Example 9 includes the non-transitory machine readable storage medium of example 8, wherein the privilege corresponds to an authorization of the cloud account to access a resource application programming interface (API) of a cloud provider using a credential.

Example 10 includes the non-transitory machine readable storage medium of example 9, wherein the instructions are to cause the programmable circuitry to compare the credential to the resource API to validate the privilege.

Example 11 includes the non-transitory machine readable storage medium of example 10, wherein the instructions are to cause the programmable circuitry to transmit an API call to get the template privileges corresponding to the cloud provider to perform an operation on the resource.

Example 12 includes the non-transitory machine readable storage medium of example 11, wherein the instructions are to cause the programmable circuitry to obtain an API response including the template privileges, and compare the template privileges to a plurality of present privileges of the cloud account to the validate the privilege, the privilege included in the plurality of present privileges.

Example 13 includes the non-transitory machine readable storage medium of example 9, wherein the privilege is a first privilege, the resource is a first resource, the instructions are to cause the programmable circuitry to validate a second privilege of the cloud account to secure a second resource before deployment of the second resource by imputing the privilege access condition to the second resource based on the second privilege satisfying at least one of the template privileges.

Example 14 includes the non-transitory machine readable storage medium of example 13, wherein the instructions are to cause the programmable circuitry to generate a notification indicating the second privilege is missing from the cloud account in response to the second privilege not being validated.

Example 15 includes a method comprising accessing a privilege from a cloud account, the privilege associated with a resource to be deployed based on a template, validating the privilege relative to template privileges associated with the template, securing, by executing an instruction with programmable circuitry, the resource before deployment of the resource by imputing a privilege access condition to the resource based on the privilege satisfying at least one of the template privileges, and deploying, by executing an instruction with programmable circuitry, the resource based on the template in a secured state, the secured state corresponding to the privilege access condition.

Example 16 includes the method of example 15, wherein the privilege corresponds to an authorization of the cloud account to access a resource application programming interface (API) of a cloud provider using a credential, validating the privilege includes comparing the credential to the resource API.

Example 17 includes the method of example 16, further including transmitting an API call to get the template privileges corresponding to the cloud provider to perform an operation on the resource.

Example 18 includes the method of example 17, further including obtaining an API response including the template privileges, and comparing the template privileges to a plurality of present privileges of the cloud account for validation of the privilege, the privilege included in the plurality of present privileges.

Example 19 includes the method of example 16, wherein the privilege is a first privilege, the resource is a first resource, further including validating a second privilege of the cloud account to secure a second resource before deployment of the second resource by imputing the privilege access condition to the second resource based on the second privilege satisfying at least one of the template privileges.

Example 20 includes the method of example 19, further including generating a notification indicating the second privilege is missing from the cloud account in response to the second privilege not being validated.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:
   interface circuitry;
   machine readable instructions; and
   programmable circuitry to at least one of instantiate or execute the machine readable instructions to:
   access a privilege from a cloud account, the privilege associated with a resource to be deployed based on a template;
   validate the privilege relative to template privileges specified in the template;
   secure the resource before deployment of the resource by imputing a privilege access condition to the resource based on the privilege satisfying at least one of the template privileges; and
   deploy the resource based on the template in a secured state, the secured state corresponding to the privilege access condition.

2. The apparatus of claim 1, wherein the privilege corresponds to an authorization of the cloud account to access a resource application programming interface (API) of a cloud provider using a credential.

3. The apparatus of claim 2, wherein the programmable circuitry is to compare the credential to the resource API to validate the privilege.

4. The apparatus of claim 2, wherein the programmable circuitry is to transmit an API call to get the template privileges corresponding to the cloud provider to perform an operation on the resource.

5. The apparatus of claim 4, wherein the programmable circuitry is to:
   obtain an API response including the template privileges; and
   compare the template privileges to a plurality of present privileges of the cloud account to validate the privilege, the privilege included in the plurality of present privileges.

6. The apparatus of claim 2, wherein the privilege is a first privilege, the resource is a first resource, the programmable circuitry is to validate a second privilege of the cloud account to secure a second resource before deployment of the second resource by imputing the privilege access condition to the second resource based on the second privilege satisfying at least one of the template privileges.

7. The apparatus of claim 6, wherein the programmable circuitry is to generate a notification indicating the second privilege is missing from the cloud account in response to the second privilege not being validated.

8. A non-transitory machine readable storage medium comprising instructions to cause programmable circuitry to at least:
   access a privilege from a cloud account, the privilege associated with a resource to be deployed based on a template;
   validate the privilege relative to template privileges corresponding to the template;
   secure the resource before deployment of the resource by imputing a privilege access condition to the resource based on the privilege satisfying at least one of the template privileges; and
   deploy the resource based on the template in a secured state, the secured state corresponding to the privilege access condition.

9. The non-transitory machine readable storage medium of claim 8, wherein the privilege corresponds to an authorization of the cloud account to access a resource application programming interface (API) of a cloud provider using a credential.

10. The non-transitory machine readable storage medium of claim 9, wherein the instructions are to cause the programmable circuitry to compare the credential to the resource API to validate the privilege.

11. The non-transitory machine readable storage medium of claim 10, wherein the instructions are to cause the programmable circuitry to transmit an API call to get the template privileges corresponding to the cloud provider to perform an operation on the resource.

12. The non-transitory machine read storage medium of claim 11, wherein the instructions are to cause the programmable circuitry to:
   obtain an API response including the template privileges; and
   compare the template privileges to a plurality of present privileges of the cloud account to the validate the privilege, the privilege included in the plurality of present privileges.

13. The non-transitory machine readable storage medium of claim 9, wherein the privilege is a first privilege, the resource is a first resource, the instructions are to cause the programmable circuitry to validate a second privilege of the cloud account to secure a second resource before deployment of the second resource by imputing the privilege access condition to the second resource based on the second privilege satisfying at least one of the template privileges.

14. The non-transitory machine readable storage medium of claim 13, wherein the instructions are to cause the programmable circuitry to generate a notification indicating the second privilege is missing from the cloud account in response to the second privilege not being validated.

15. A method comprising:
   accessing a privilege from a cloud account, the privilege associated with a resource to be deployed based on a template;
   validating the privilege relative to template privileges associated with the template;
   securing, by executing an instruction with programmable circuitry, the resource before deployment of the resource by imputing a privilege access condition to the resource based on the privilege satisfying at least one of the template privileges; and deploying, by executing an instruction with programmable circuitry, the resource based on the template in a secured state, the secured state corresponding to the privilege access condition.

16. The method of claim 15, wherein the privilege corresponds to an authorization of the cloud account to access a resource application programming interface (API) of a cloud provider using a credential, validating the privilege includes comparing the credential to the resource API.

17. The method of claim 16, further including transmitting an API call to get the template privileges corresponding to the cloud provider to perform an operation on the resource.

18. The method of claim 17, further including:
obtaining an API response including the template privileges; and
comparing the template privileges to a plurality of present privileges of the cloud account for validation of the privilege, the privilege included in the plurality of present privileges.

19. The method of claim 16, wherein the privilege is a first privilege, the resource is a first resource, further including validating a second privilege of the cloud account to secure a second resource before deployment of the second resource by imputing the privilege access condition to the second resource based on the second privilege satisfying at least one of the template privileges.

20. The method of claim 19, further including generating a notification indicating the second privilege is missing from the cloud account in response to the second privilege not being validated.

* * * * *